United States Patent [19]

Jacky

[11] Patent Number: 4,602,560

[45] Date of Patent: Jul. 29, 1986

[54] CONTROL PROCESS AND DEVICE FOR THE MOVEMENTS OF A PART, AND THEIR USE IN A HAY GATHERING MACHINE

[75] Inventor: Herbert Jacky, Parthenay, France

[73] Assignee: Electromeca S.A., Parthenay, France

[21] Appl. No.: 576,505

[22] Filed: Feb. 2, 1984

[30] Foreign Application Priority Data

Feb. 3, 1983 [FR] France ................................ 83 01696

[51] Int. Cl.⁴ ............................................. B65B 13/04
[52] U.S. Cl. .......................................... 100/3; 100/4;
100/5; 100/13; 364/400
[58] Field of Search ........................ 100/5, 2, 4, 13, 88,
100/99, 3; 56/341, 343; 82/14 R, 14 A, 14 B, 14
C; 364/194, 400; 83/71; 72/7

[56] References Cited

U.S. PATENT DOCUMENTS

| | | | |
|---|---|---|---|
| 3,674,063 | 7/1972 | Klingbeil | 82/14 C |
| 4,022,120 | 5/1977 | McAllister | 100/5 |
| 4,328,050 | 5/1982 | Ashizawa | 83/71 |
| 4,354,429 | 10/1982 | Boldenow | 100/5 |
| 4,386,561 | 6/1983 | Viaud | 100/5 |

*Primary Examiner*—Billy J. Wilhite
*Attorney, Agent, or Firm*—Millen & White

[57] ABSTRACT

The invention relates to a hay baling device comprising means (13) for defining a training phase working mode and an automatic flow working mode of a previously recorded reproducible program. Means (14) are also provided, operative in the training phase for controlling the movements of the part manually by selecting parameters of successive steps comprising at least, for each step, the duration of the step and the direction of movement, selected from among a forward position, a reverse position and a stationary position. In addition, included are means (10) for then recording the parameters of the successive steps in the form of a reproducible program.

8 Claims, 4 Drawing Figures

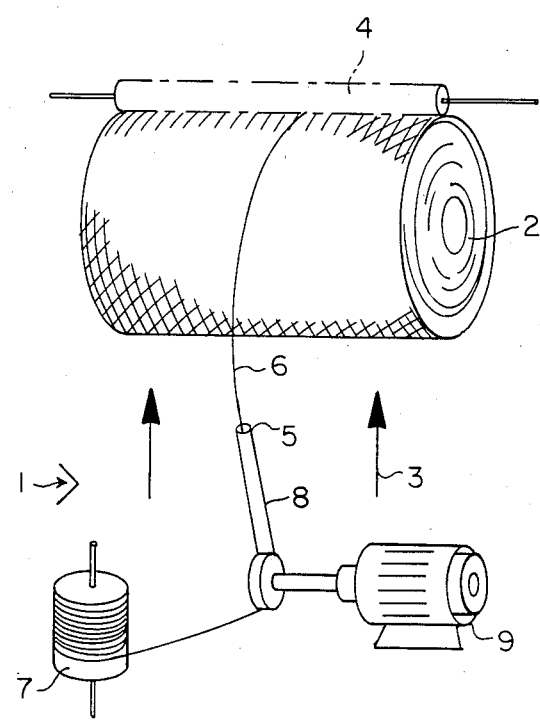
FIG_1

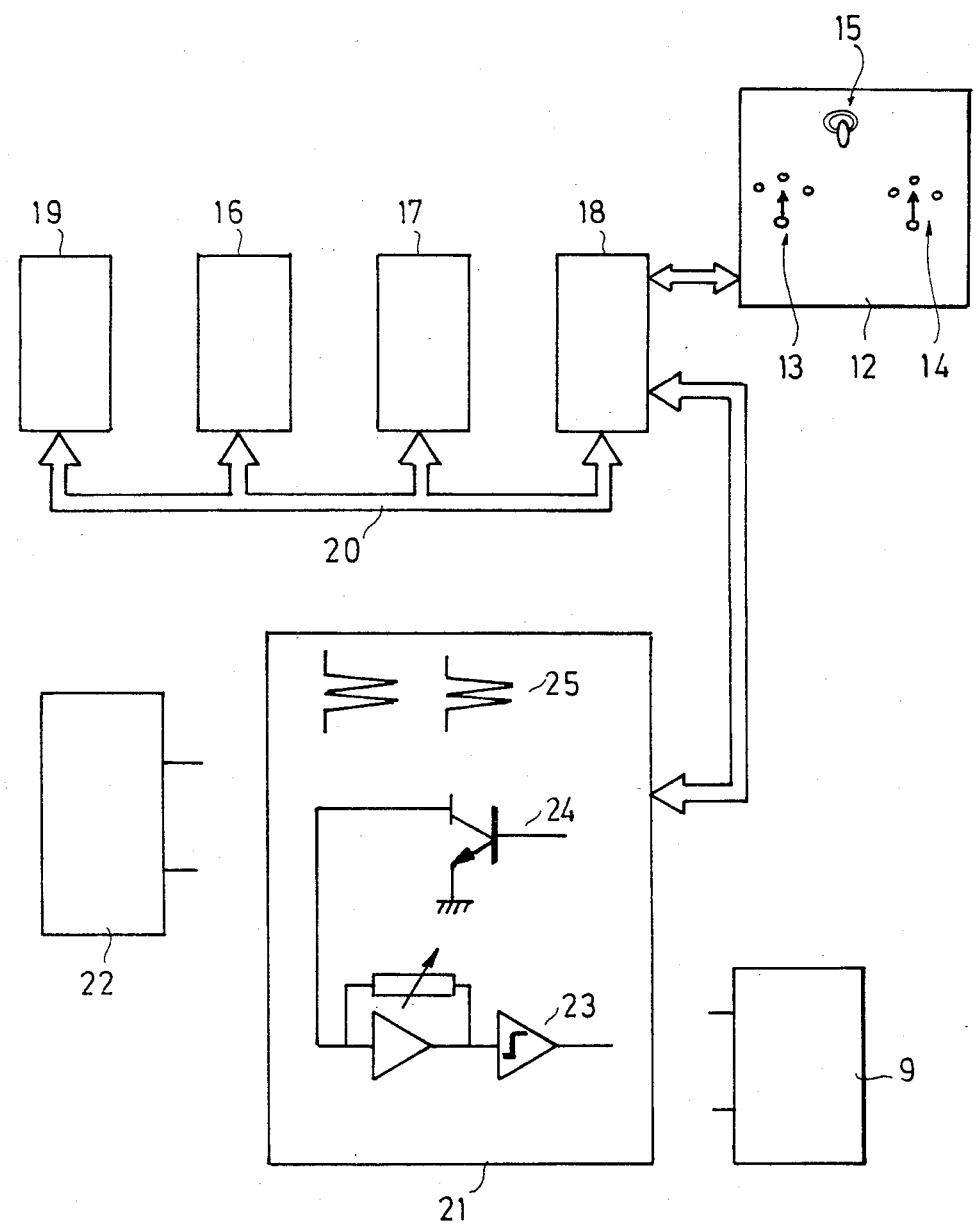
FIG_2

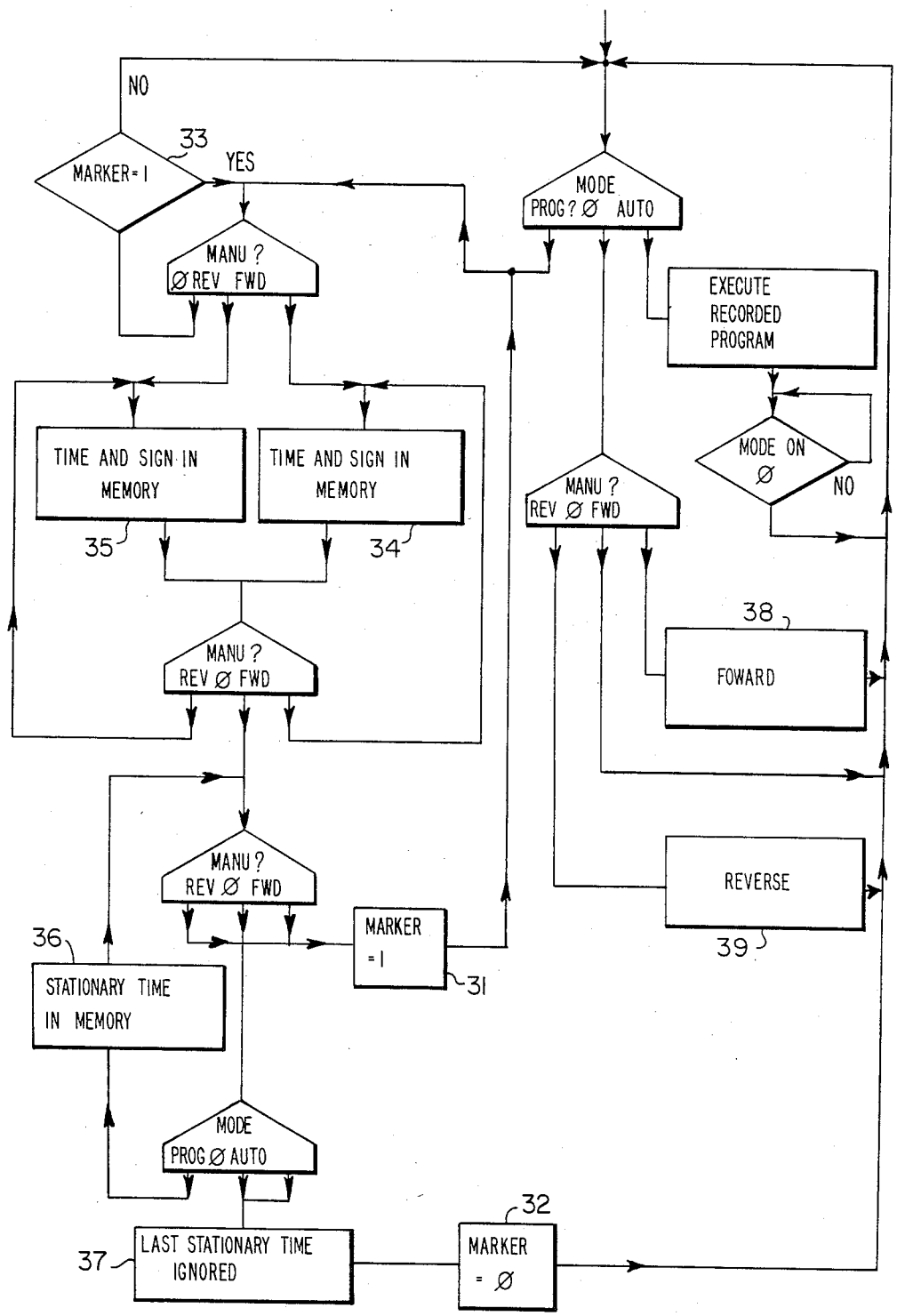
FIG_3

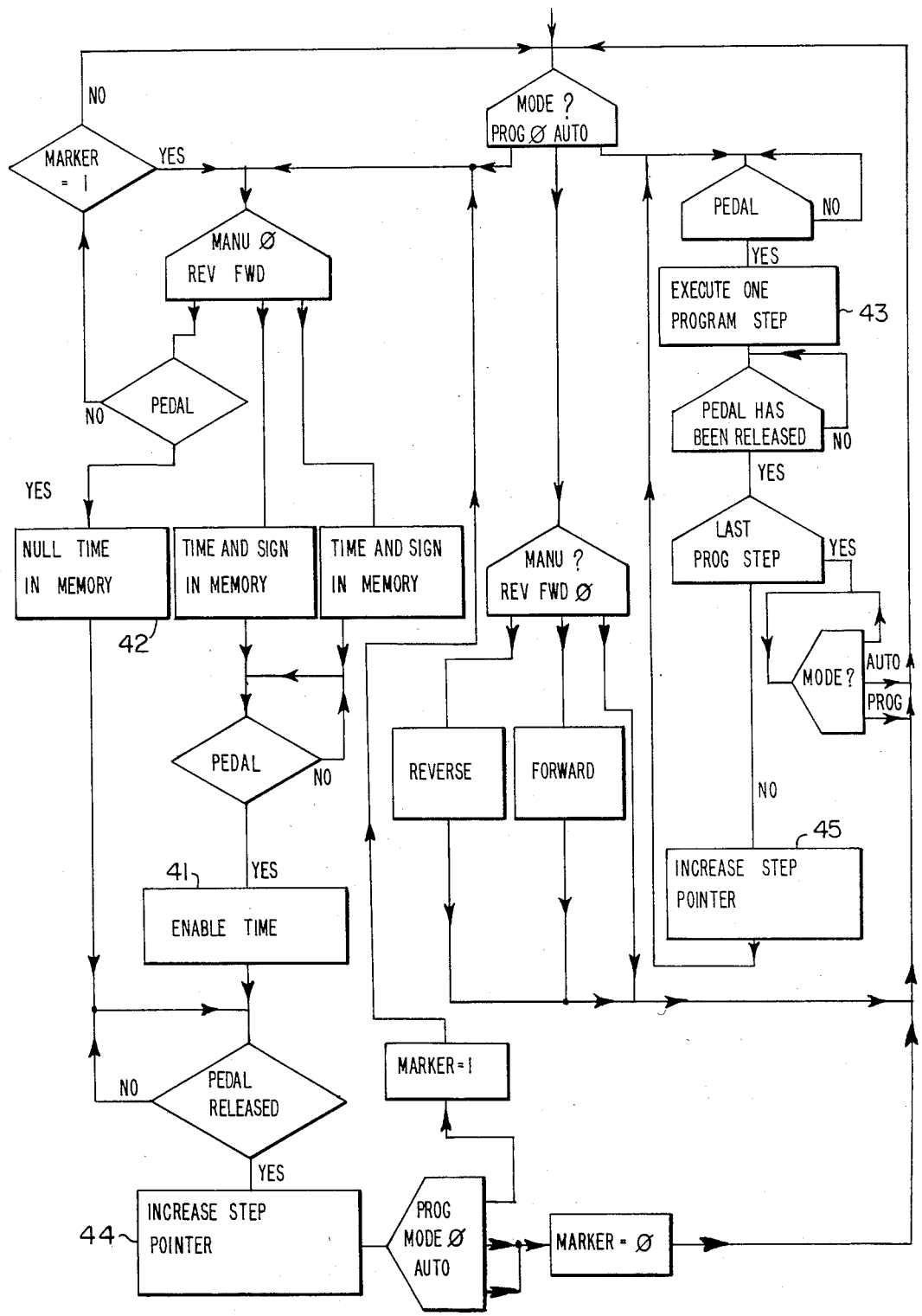
FIG_4

CONTROL PROCESS AND DEVICE FOR THE MOVEMENTS OF A PART, AND THEIR USE IN A HAY GATHERING MACHINE

FIELD OF THE INVENTION

The present invention relates to control processes for the movements of a part and the automatic tying of bales of hay, it being understood that the term "hays" designates all types of fodders or plants gathered in the fields after reaping.

PRIOR ART

In order to execute the tying of bales of hay, automatic machines are known which wrap each bale in a twine as soon as it is formed. In fact, the bale is formed during the movement of the machine in the field, by the accumulation of the hay in a cylindrical chamber into which it is sucked tangentially and driven in rotation, and the twine is wound round by virtue of this same rotation. The free end of the twine is fed at the circumference of the bale when the latter has virtually attained the required diameter, and whilst the bale continues to rotate, the feed point of the twine is moved parallel to the axis of rotation, so that the twine winds around the bale in a helicoidal spiral, optionally in a plurality of juxtaposed or superposed helices. The twine is afterwards cut, and the bale is discharged from the chamber, which thus becomes available for the formation of the next bale.

However, these known machines are still not satisfactory, essentially due to lack of flexibility. The user is compelled to perform the tying manually, that is to say, he must position the twine by judgement, with no margin for error, at the risk of placing one or more additional turns. In order to conform better to the practical demands of this technique, the invention proposes a novel solution which permits the farmer to be released as far as possible to drive the tractor of the machine, whilst utilizing his experience in defining the mode of tying the bales for each particular hay and field.

SUMMARY OF THE INVENTION

The invention therefore has as its object to provide a machine for gathering hay into bales, with automatic tying of the bales, comprising a cylindrical bale formation chamber into which the hay is sucked tangentially and driven in rotation about the axis of the chamber, a guide to feed the end of a twine at the circumference of a bale at the end of its formation in said chamber, and means for moving said guide parallel to the axis of rotation of the bale. The means for moving the guide parallel comprises means for determining a tying program defined in accordance with the guide movement controls effected manually for a first bale, and means for controlling the movement of the guide automatically according to the tying program thus defined for each of the subsequent bales.

The tying program adopted is therefore determined neither by design, nor by complex theoretical calculations, but actually by the farmer himself when he operates according to his custom and to his practise for various hays.

In the first working phase of the machine, which permits its training as it were, tha characteristics of the successive steps of the manually controlled movements are automatically recorded. According to a preferred embodiment of the invention, the movements are in general sufficiently defined, in the practice of application to the tying of bales of hay, by the duration of each step and the direction of movement of the drive motor during the step, by optionally giving this direction three possible values, corresponding respectively to forward, reverse and stationary. If necessary, it may be advantageous to add to these another parameter, such as other values of the speed. It is therefore possible to define in the tying program all kinds of combinations of elements which will afterwards be reproduced automatically on the other bales. Tighter or looser, and more or less numerous turns correspond to the successive movement steps, the speed of rotation of the bale itself generally being constant. The operator will, for example, have complete liberty to program, in any order, tight turns to anchor the twine at one end of the bale, loose turns to traverse rapidly the entire cylindrical length of the bale, tighter turns overlapping the loose turns, optionally in a plurality of superposed layers in opposite winding directions, and all this by manual operation which he will have learned by experience, without any need for him to exercise any mathematical or theoretical knowledge and without him being hindered by imposed automation standards.

The solution to control the tying in the hay gathering machine proposed according to the invention is capable of finding use in other applications, to control the movements of all types of parts, whether these movements are determined directly from motors or through the intermediary of relays or any transmission systems.

The known solutions to permit the programmed flow of the movement controls of a part, the positioning of a tool, for example, rely either upon an open-loop wired time programming, or upon the counting of the steps of a stepping motor, or upon monitoring a sensor detecting the presence of the part in predetermined positions. The first solution clearly lacks flexibility, stepping motors are frequently prohibitive in price, and monitoring by sensors must be reserved for cases where the precision required justifies their high cost.

The present invention permits these disadvantages to be avoided by virtue of the recording, in a training phase during which the controls are effected manually, of an automatically reproducible control program, by parameters of successive steps comprising at least, for each step, the duration of the movement and its direction, and also the duration of the stationary state.

Thus the invention also has as an object a process to control the movements of a part, whereby, in a training phase, the movements of the part are controlled manually and a reproducible control program is determined by the automatic recording of parameters of successive steps comprising at least, for each step, the duration of movement of the part and its direction.

The direction of movement in each step may advantageously be selected from among a forward position, a reverse position and a stationary position, whilst it is generally unnecessary to involve other values of movement speed. As to the stationary position, it is certainly desirable when, in the reproduction phase of the recorded program, the flow of the controls is required to be automatic from the first to the last step. However, this stationary position may also well become superfluous in other cases, if for example it is desired to leave the starting of each of the successive steps of the program to the operator's initiative every time. The device according to the invention may therefore comprise means to control at will the enabling of the recording of the parameters of each of the successive steps, in training phase working mode, and the tripping of the steps, step by step, in the automatic program flow working mode.

Obviously, both possibilities may exist in combination in one and the same machine, so that the operator can make a selection between them at the outset.

According to other variants of the invention, the duration of each of the successive steps may be fixed at predetermined values, identical or different according to the position selected for the direction of movement. Depending upon specific applications, the recording operation for each step of the program may also be omitted. However, in this case the automatic flow of the program then requires the operator to control the starting and the stopping of each step, which demands his presence when in most cases this is rather to be avoided.

BRIEF DESCRIPTION OF THE DRAWINGS

The invention will now be described more fully in the context of its application to the tying of bales of hay, in a particular construction which in no way implies a limitation and which is illustrated by FIGS. 1 to 4, wherein:

FIG. 1 shows the principle of gathering hay by a machine according to the invention;

FIG. 2 shows diagrammatically the construction of a control device according to the invention contained in this machine;

FIG. 3 summarizes a first data flow diagram for the working of this device; and

FIG. 4 shows, in the same way, a second working mode, adopted as a variant.

DETAILED DESCRIPTION

The hay gathering machine equipped according to the invention is not illustrated in its entirety in FIG. 1, the elements not shown being entirely conventional per se in existing machines. This machine gathers the hay and forms it into bales whilst it is being towed across the fields by a tractor. For this purpose it comprises a cylindrical chamber in which the bale of hay 2, of the same shape, is formed. This chamber may be limited by rollers, belts or chains. It may be of variable or fixed dimensions depending upon the model. The hay enters it tangentially in the direction of the arrows 3, through one or more inlet slots in the chamber, oriented along a generatrix. It is sucked and driven in rotation by rotary rollers 4 arranged at the circumference of the chamber longitudinally. These may be, for example, rollers limiting the chamber, which are mounted on brackets at the end of the cylindrical volume so as to be able to move more or less away from the axis. The rotation progressively shapes the hay into a cylindrical bale by winding upon itself, whilst it accumulates in the chamber until it fills the latter completely. The tying of the bale is then effected before it is ejected from the chamber. The movement of the machine in the field is generally interrupted during the tying, but the bale continues to be driven in rotation, whereas no further admission of hay occurs. The ejection of the completed and tied bale occurs by opening the chamber.

The tying is effected by means of a twine 6, unwound continuously from a supply reel 7. The free end of this twine passes through a guide 8 which permits it to be brought opposite the hay inlet slot in the chamber, to be admitted there at the circumference of the bale. The guide 8 is a tube movable about a fixed point so that its end 5 forming the feed point of the twine to the inlet of the slot in the chamber moves along the latter, in one or the other direction, by the action of a motor 9 which effects the driving of the guide. Between two tying operations, the twine is rendered inactive in that the guide 8 is rocked into a standby position where its end is located outside the hay suction region, on the side of the chamber. The twine is cut after each tying operation, between two successive bales, since on its return into the standby position, the guide part passes in front of a cutting tool which is illustrated schematically in the form of a knife 1.

The tying of each bale is performed by moving the guide 8 according to a tying program which is defined at the start of a hay gathering period for a given quality of hay, and which is then reproduced automatically with the successive bales. Thus the tying can be adapted at will to the type of hay to be baled. More specifically, the movement controls of the guide 8 are repeated, identically to those which were performed manually for the tying of a first bale, in what may be called a training phase, as will be understood by what follows.

For this purpose, the machine comprises a microprocessor device, which appears as an electronic cabinet, and which comprises, according to FIG. 2, a control panel 12, on which two three-position knobs 13 and 14 are accessible, plus a Start/Stop knob 15. A control circuit 21 comprises power transmission relays required for the operation of the motor 9, and an energy source 22, consisting of a 12-volt direct-current supply battery. The microprocessor is connected by a bus 20 to an integrated active memory 16, to a read-only memory 17 containing the working logic, and to a programmable interface 18, through the intermediary of which the transfers of the input and output signals are effected between the various elements, particularly the panel 12 and the motor control circuit 21.

On the control panel, the knob 15 is a simple energizing switch, which also serves as a clearing switch to erase any program started and considered incorrect.

The knob 13 ("MODE") is used to define the working mode. It exhibits three possible positions, one of which is only instantaneous. The position "PROG" determines working in the training phase for the recording of a program. After this, each impulse given from the neutral position to the "AUTO" position trips the operation in automatic program working for a sequence identical to that which has been recorded.

The knob 14 ("MANU") is used in the training phase to control the successive steps of the sequence. It exhibits three positions, two of which are instantaneous: a forward position ("FWD") which controls the rotation of the motor in one direction, and therefore the movement of the guide in a corresponding direction, a reverse position ("REV") which determines the rotation and the movement in the opposite direction. The intermediate neutral position is the stationary position in which the guide is motionless.

The time when the knob remains in the stationary position, the time when the operator maintains it in the forward position, and the time when he maintains it in the reverse position, represent as many successive steps of the sequence being programmed. The speed of rotation of the motor is not otherwise adjustable. The electronic circuits record each step by the position selected and the period for which it is maintained.

These various operations are illustrated in the data flow chart in FIG. 3. This shows the actions of a marker, which is displayed at 31 when the operation returns into the stationary position after a forward or reverse movement, erased at 32 at the end of the sequence when the operator cancels the "PROG" mode and tested at 33 if the knob "MANU" is in the stationary position when the "PROG" mode is tripped. This marker thus protects the program recorded, by ensuring that it is not erased if the operator inadvertantly moves the "MODE" knob to "PROG", and then returns immediately without effecting any forward or reverse movement control.

The duration and the sign of the movement, in the case of forward and in the case of reverse movement respectively, are recorded at 34 and 35, and the duration of the stationary state is recorded at 36. When reading the program, any last stationary time is ignored (at 37). It will also be seen that the forward and reverse movements of the guide controlled can be effected, at 38 and 39, without recording the corresponding parameters, by operating the "MANU" knob when the "MODE" knob is in the neutral position; thus a previously recorded program is not disturbed.

The device installed on the machine described proposes at the level of the logic which it contains, a choice between the version which was assumed to be used above, and the version, the performance of which is illustrated by the data flow chart of FIG. 4.

This second version requires the use of a pedal in addition to the "MANU" and "MODE" knobs. This pedal serves to trip the different steps of the program one by one ("step by step"), both during recording in the training phase and during reading in the "AUTO" mode. At 41 the duration and the sign of a movement (forward or reverse) await a pedal movement for their recording to be enabled. In the case where the pedal action occurs in the stationary position, this is a null time which is stored at 42. During reading, the instantaneous "AUTO" position of the "MODE" knob enables the flow of the recorded program starting from the beginning of the sequence, but the successive steps are executed step by step, at 43, at each pedal action. The steps are counted at 44 during recording and at 45 during reading. Otherwise the "MODE" and "MANU" controls are employed as in the first version, and likewise the marker.

Obviously, the invention is in no way limited by the particulars given in the context of the description of a particular mode of construction. On the other hand, the device and the machine according to the invention may undergo various improvements. For example, safety locks may be provided operated by a torque limiter fitted to the motor or by stops actuated by the twine feed guide at its end of stroke. A stop detection system by current measurement has thus been shown diagrammatically at 23 in the circuit 21 in FIG. 2, beside two relays 25, which shunt the current through the motor as a function of the direction commanded, and a power transistor 24 which effects the switching and permits the current supply to the motor to be shut off in case a predetermined voltage threshold is exceeded.

Furthermore, non-volatile memories may permit recorded program sequences to be retained. It would also be possible to record a plurality of different sequences, among which the choice will be made by a supplementary selector switch. It is also possible, during the recording and during reading within the context of the program, to control auxiliary functions, such as the starting up of a solenoid valve, of an alarm, or of a signal lamp.

Many other variations may still be applied to the various elements described without departing from the ambit of the present invention.

What is claimed is:

1. In a process for gathering hay into bales, with automatic tying of the bales, the process comprising sucking in hay in a tangentially direction to and into a cylindrical bale formation chamber and driving the hay in rotation about the axis of the chamber, feeding the end of a twine through a twine guide to feed the end of the twine at the circumference of a bale in the chamber, and moving said guide, by guide moving means, relative to a hay inlet of the chamber according to successive steps of movement, wherein the improvement comprises initially controlling manually the successive steps of movements of said twine guide in a training phase for tying a first bale, recording of parameters corresponding to said successive steps comprising at least, for each step, the duration of the step and the direction of movement of said twine guide, thereby generating a reproducible tying program, and controlling automatically the movement of the twine guide according to said tying program for tying each of a plurality of subsequent bales.

2. A process as in claim 1, wherein the direction of movement of the twine guide is selected from among a forward position, a reverse position and a stationary position.

3. A process for controlling the movement of a twine guide in a machine for gathering hay into bales, to feed the end of a twine at the circumference of a bale, comprising initially controlling manually in a training phase the movements of said twine guide for tying a first bale, and recording a reproducible control program comprising automatically recording of parameters corresponding to successive steps of movement of said twine guide for tying of said first bale to thereby generate a reproducible control program, and reproducing automatically said reproducible control program for tying each of a plurality of subsequent bales.

4. A process as in claim 3, further comprising recording at least, for each step, the duration of movement of said twine guide and the direction of movement of said twine guide.

5. A process as in claim 4, wherein the direction of movement of the twine guide is selected from among a forward position, a reverse position and a stationary position.

6. In a machine for gathering hay into bales, with automatic tying of the bales, comprising a cylindrical bale formation chamber into which hay is sucked tangentially and driven in rotation about the axis of the chamber, a twine guide for feeding the end of a twine at the circumference of a bale after its formation inside the chamber, and guide moving means for moving said guide relative to the hay inlet in the chamber, wherein the improvement comprises a guide control device for controlling the movements of said twine guide for tying the successive bales, said guide control device comprising defining means for defining a training phase working mode and an automatic flow working mode of a previously recorded reproducible tying program, control means operative in a training phase for manually controlling the movements of said guide for tying a first bale by selecting parameters corresponding to successive tying steps and comprising, at least for each step, the duration of the step and the direction of movement of said twine guide, selected from the group consisting of a forward position, a reverse position and a stationary position, and recording means for then recording the parameters of the successive steps in the form of reproducible program for tying subsequent bales for being reproduced by putting the guide control device into the automatic flow working mode.

7. A machine as in claim 6, further comprising means for controlling at will the performing of the recording of the parameters of each of the successive steps in the training phase working mode and the tripping of the steps, step by step, in the automatic program flow working mode.

8. A machine as in claim 6, wherein said means for defining a working mode is adapted for operation in a working mode wherein the movements of the part are controlled manually without the parameters of the corresponding steps being recorded.

* * * * *